United States Patent
MacWilliams et al.

(10) Patent No.: US 12,147,590 B2
(45) Date of Patent: Nov. 19, 2024

(54) ALIGNING AND AUGMENTING A PARTIAL SUBSPACE OF A PHYSICAL INFRASTRUCTURE WITH AT LEAST ONE INFORMATION ELEMENT

(71) Applicant: Siemens Aktiengesellschaft, Munich (DE)

(72) Inventors: Asa MacWilliams, Fürstenfeldbruck (DE); Daniel Labisch, Karlsruhe (DE); Joseph Newman, Unterhaching (DE); Andreas Hutter, Munich (DE); Andoni Gonzalo, Berango (ES); Gert De Nul, Aalst (BE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 90 days.

(21) Appl. No.: 17/916,970

(22) PCT Filed: Mar. 30, 2021

(86) PCT No.: PCT/EP2021/058219
§ 371 (c)(1),
(2) Date: Oct. 4, 2022

(87) PCT Pub. No.: WO2021/204587
PCT Pub. Date: Oct. 14, 2021

(65) Prior Publication Data
US 2023/0162394 A1 May 25, 2023

(30) Foreign Application Priority Data
Apr. 6, 2020 (EP) .................................. 20168213

(51) Int. Cl.
*G06F 3/01* (2006.01)
*G06T 7/73* (2017.01)
(Continued)

(52) U.S. Cl.
CPC ............... *G06F 3/011* (2013.01); *G06T 7/75* (2017.01); *G06V 20/20* (2022.01); *G06T 2207/30204* (2013.01); *G06V 10/245* (2022.01)

(58) Field of Classification Search
None
See application file for complete search history.

(56) References Cited

U.S. PATENT DOCUMENTS 9,984,499 B1 * 5/2018 Jurgenson ............. G06T 19/006
10,929,670 B1 * 2/2021 Troy .................... G06V 20/653
(Continued)

FOREIGN PATENT DOCUMENTS

WO  2019 211764  11/2019  ............... G06K 9/00

OTHER PUBLICATIONS

Search Report for International Application No. PCT/EP2021/058219, 14 pages, May 7, 2021.
(Continued)

*Primary Examiner* — James A Thompson
(74) *Attorney, Agent, or Firm* — Slayden Grubert Beard PLLC (57) ABSTRACT

Various embodiments include a computer-implemented method for augmenting a physical infrastructure with an information element. The method may include: acquiring data of a spatial environment infrastructure, dimensioned by a coordinate system; defining a second spatial environment as a subspace of the first and dimensioned by its own coordinate system with a first marker item and a second marker item; creating a SLAM map of the second environment with two SLAM marker items; recognizing the SLAM identifiers; aligning the coordinate system of the SLAM map to the coordinate system of the second environment; recognizing a first and a second marker identifier; determining an absolute position and orientation of the second spatial envi- (Continued)

ronment relative to the first environment; defining the information element in relation to a component of the infrastructure; determining coordinates of the element in the second environment; and augmenting the physical infrastructure with the information element at the spatial coordinates.

11 Claims, 1 Drawing Sheet

(51) Int. Cl.
*G06V 20/20* (2022.01)
*G06V 10/24* (2022.01)

(56) References Cited

U.S. PATENT DOCUMENTS

| | | | | |
|---|---|---|---|---|
| 2014/0267417 | A1 | 9/2014 | Bare | G06T 19/00 |
| 2015/0302649 | A1* | 10/2015 | Komatsu | G06T 7/70 |
| | | | | 345/633 |
| 2016/0180602 | A1 | 6/2016 | Fuchs | G06T 19/20 |
| 2017/0243403 | A1* | 8/2017 | Daniels | G06F 3/1454 |
| 2019/0108683 | A1* | 4/2019 | Valli | G06T 19/003 |
| 2020/0019781 | A1 | 1/2020 | Smith | G06K 9/00 |
| 2020/0249819 | A1* | 8/2020 | Berquam | G06T 19/006 |

OTHER PUBLICATIONS

Subakti Hanas et al., "Indoor Augmented Reality Using Deep Learning for Industry 4.0 Smart Factories" 2017 IEEE 41st Annual Computer Software and Applications Conference (COMPSAC), Jul. 23, 2018 IEEE—ISSN 0730-3157 ISBN 978-1-5386-2667-2, vol. 2, pp. 63-68, 2017.

Coscetti Simone et al., "Augmented Reality for Tissue Converting Maintenance" 2019 15th International Conference on Signal-Image Technology & Internet-Based Systems (SITIS), Nov. 26, 2019 IEEE, pp. 585-590.

\* cited by examiner

ALIGNING AND AUGMENTING A PARTIAL SUBSPACE OF A PHYSICAL INFRASTRUCTURE WITH AT LEAST ONE INFORMATION ELEMENT

CROSS-REFERENCE TO RELATED APPLICATIONS

This application is a U.S. National Stage Application of International Application No. PCT/EP2021/058219 filed Mar. 30, 2021, which designates the United States of America, and claims priority to EP Application No. 20168213.5 filed Apr. 6, 2020, the contents of which are hereby incorporated by reference in their entirety.

TECHNICAL FIELD

The present disclosure relates to physical infrastructure. Various embodiments of the teachings herein relate to computer-implemented methods and/or systems for augmenting a physical infrastructure with at least one information element.

BACKGROUND

Augmented reality (AR) provides an interactive experience to a user in a real-world environment. Objects that reside in the real-world environment are augmented by computer-generated information. The displayed overlaid information can be interwoven in the augmented reality with the physical real-world such that it is perceived by the user as an immersive aspect of the real environment. Augmented reality can be used to enhance natural environments or situations and offer perceptually enriched experiences to the user or operator. With the help of advanced augmented reality technologies, information about the surrounding real-world environment of the user can become interactive and can be manipulated by the user. In augmented reality, information about the environment and its objects is overlaid on the real-world. The displayed information can be virtual or real, e.g. allowing to perceive other real-sensed or measured information such as electromagnetic radio waves overlaid in exact alignment to where they are in space. Augmentation techniques are typically performed in real time and in a semantic context with environmental elements or objects.

In many use cases, it is necessary to place augmented reality annotations relative to a specific location or object in the physical real-world. Other users later wish to retrieve, view or edit this information when they are near the respective place or object. In industrial applications, this particularly is useful to information that is relevant to a piece of physical infrastructure. However, the uses are not limited to industry. A specific example is machine commissioning, service and maintenance-relevant information like the type of material/parameters, etc., and can be provided upfront and/or annotated persistently during the commissioning, service, and/or maintenance activities.

A further example are construction sites that can be 'digitally built' on the later location in real time during the design process, by combining 3D models and information with georeferenced data. This enables improved on-site design and planning discussions, verification of installation, clash detection and improved efficiency during construction and/or installation. A further example includes live data feeds from machines. Data can be made available anytime, anywhere, in any required form via AR.

A further example is viewing step-by-step workflow information for repairing process automation equipment, using a head-worn augmented reality display, in a chemical or pharmaceutical plant. A further example is an inspection walkthrough in a power plant, creating annotations to document potential problems using an augmented reality app on a smartphone.

Many different approaches exist for creating augmented reality content and later retrieving the augmented reality content. These conventional approaches include marker-based augmented reality where an augmented reality content is created in a three-dimensional graphics programming environment and anchored to a two-dimensional visual marker. The augmented reality content is then retrieved when this two-dimensional visual marker is inside of a camera of a client device and/or mobile device handled by a user. Marker-based augmented reality is typically used for augmented reality marketing apps, for instance to place three-dimensional models on top of a magazine advertisement.

Another conventional approach is object-based augmented reality. Augmented reality content is created in a three-dimensional graphics programming environment and then anchored to a three-dimensional computer-aided design, CAD, data model. The augmented reality content is retrieved when the real object is detected by a client device and/or mobile device using a model-based tracking approach. The object-based augmented reality is often used for maintenance applications in an industrial environment.

Another conventional approach is georeferenced augmented reality. The augmented reality content is generated and then retrieved in a geographically referenced content. This is limited by the accuracy of the employed GPS system.

A further conventional approach is to place holograms which are basically three-dimensional models within an augmented environment that a client device of a user can recognize. Later, when another user uses the same client device in the same place, a hololens can recognize the place based on the three-dimensional reconstruction of the environment and show the hologram at the same place.

A further conventional approach is wide-area RF location technology, e.g. ultrawideband, which can track the position of an augmented reality device to within an accuracy of a few centimetres. This requires either the installation of base stations for tracking, or the measurement of signal strengths of installed field devices' built-in wireless networks.

A further conventional approach is marker-based optical tracking technology. A camera on the augmented reality device recognizes optical markers which are placed at different positions throughout the plant. Each optical marker is designed to be easily recognizable by image processing techniques. A piece of software on the augmented reality device detects the marker, thus identifying which part of the plant the user is in; and then performs pose estimation based on the perspective in which the marker appears from the devices' camera position. Thus, when a marker is detected, the AR device has a good estimation of exactly where it is within the plant. This technology has the drawback that special markers must be placed at exactly defined locations in the plant.

A further conventional approach is wide-area visual-inertial odometry. For this, the area of the plant is first mapped using an augmented reality device that has a camera and additional inertial/magnetic sensors. The data is gathered to create a (usually sparse) 3D feature map or point cloud of the environment. This can be stored on the AR device itself, or on a server. Later, the AR device uses optical features it detects in its camera image to search the created feature map, and thus deduce its current position. This technology has the drawback that changes in brightness (e.g. due to solar radiation) disturb the quality of recognizing features during location.

A further conventional approach is laser scanning, photogrammetry, and later server-side image processing. Here, as a first step, one user creates a laser scan of a site, e.g. by pushing a cart with a laser scanner and omnidirectional cameras through a building and pressing a "scan" button every few meters. This creates a coloured point cloud, which is uploaded to a server. Later, to localize the AR device, the AR device takes one or more photographs of where it is and sends it to the server. The server performs image processing to find out where this image is likely to be within the stored point cloud and returns this as a pose estimation to the AR device.

Each of the technologies listed above suffers from some deficiencies, e.g., in terms of preparation effort, in long-term durability of markers, in spatial accuracy, or in interoperability across these technologies.

SUMMARY

Accordingly, there is a need for providing a method and/or apparatus for augmenting a physical infrastructure precisely at exact positions relative to the real equipment. Embodiments herein generally include a computer-implemented method for augmenting a physical infrastructure with at least one information element. For example, some embodiments include a computer-implemented method for augmenting a physical infrastructure with at least one information element (4), the method comprising: acquiring 3-dimensional data of a first spatial environment (1) within the physical infrastructure, the first spatial environment (1) being dimensioned by a coordinate system of the first spatial environment, defining at least one second spatial environment (2) as a partial subspace of the first spatial environment (1), the at least one second spatial environment (2) being dimensioned by a coordinate system of the at least one second spatial environment (3) and the at least one second spatial environment (2) comprising at least one first marker item (5) and at least one second marker item (5), creating at least one simultaneous location and mapping map (SLAM) of the at least one second spatial environment (3), the at least one simultaneous location and mapping map being dimensioned by a coordinate system of the at least one simultaneous location and mapping map, the at least one simultaneous location and mapping map (SLAM map) contains at least two SLAM marker items with each at least one SLAM marker identifier within the coordinate system of the at least one simultaneous location and mapping map, recognizing the said SLAM marker identifiers, aligning the coordinate system of the at least one simultaneous location and mapping map to the coordinate system of the at least one second spatial environment (3), recognizing at least one first marker identifier and at least one second marker identifier, the at least one first marker identifier corresponding to the at least one first marker item (5) and the at least one second marker identifier corresponding to the at least one second marker item (5), determining an absolute position and orientation of the at least one second spatial environment (2) relative to the first spatial environment (1) by matching the at least one first marker item (5) and the at least one second marker item (5) to align the coordinate system of the first spatial environment and the coordinate system of the at least one second spatial environment (3), defining the least one information element (4) being related to at least one component of the physical infrastructure, determining spatial coordinates of the information element (4) in the coordinate system of the at least one second spatial environment (3), and augmenting the physical infrastructure with the at least one information element (4) at said determined spatial coordinates.

In some embodiments, the least one information element (4) is configured to be modified, added, and/or deleted by a user and/or a machine.

In some embodiments, augmenting the physical infrastructure comprises augmenting by: an annotation, a text, a 3D model, a chart, an animation, a moving 3D-model, an instructional document, a photo, a video, an arrow, a drawing, live data, and/or a link to live data.

In some embodiments, the method further includes providing an audio output and/or a voice output augmenting the at least one information element (4).

In some embodiments, the at least one first marker identifier and/or the at least one second identifier include: a text, a numeric code, a text of an identifier label, a text of a street sign, a poster, a sign, a bar code, a QR code, a category of an object as returned by an image processing algorithm, and/or a category of an object as returned by a 3D object detection algorithm.

In some embodiments, the at least one second spatial environment (2) is locatable by GPS, Wi-Fi and/or a location mechanism.

In some embodiments, the at least one second spatial environment (2) comprises at least one spatial environment identifier unique within the first spatial environment.

In some embodiments, the at least one spatial environment identifier includes:
a room name tag,
an object,
a serial number,
an RF beacon,
an NFC tag, and/or
a Wi-Fi access point fingerprint.

In some embodiments, the at the least one spatial environment identifier is equal to the at least one first marker identifier (5) and/or the at least one second identifier (5).

In some embodiments, characteristics of the at least one simultaneous location and mapping map (SLAM) are adapted on the at least one second spatial environment.

As another example, some embodiments include an augmented reality engine for augmenting a physical infrastructure with at least one information element, the augmented reality engine comprising: at least one processor; and at least one data storage device having stored thereon computer executable program code, which, when executed by the processor, causes the augmented reality engine to: establish a first spatial environment (1) within the physical infrastructure, the first spatial environment (1) being dimensioned by a coordinate system of the first spatial environment, define at least one second spatial environment (2) as a partial subspace of the first spatial environment (1), the at least one second spatial environment (2) being dimensioned by a coordinate system of the at least one second spatial environment (3) and the at least one second spatial environment (2) comprising at least one first marker item (5) and at least one second marker item (5), create at least one simultaneous location and mapping map, the at least one simultaneous location and mapping map being dimensioned by a coordinate system of the at least one simultaneous location and mapping map, the at least one simultaneous location and mapping map (SLAM map) contains at least two SLAM marker items with each at least one SLAM marker identifier within the coordinate system of the at least one simultaneous location and mapping map, recognize the said SLAM marker identifiers, align the coordinate system of the at least one simultaneous location and mapping map to the coordinate system of the at least one second spatial environment (3), recognize at least one first marker identifier and at least one second marker identifier, the at least one first marker identifier corresponding to the at least one first marker item (5) and the at least one second marker identifier corresponding to the at least one second marker item (5), determine an absolute position and orientation of the at least one second spatial environment (2) relative to the first spatial environment (1) by aligning the coordinate system of the first spatial environment and the coordinate system of the at least one second spatial environment (3) using the at least one first marker item (5) and the at least one second item (5), define the least one information element (4) being related to at least one component of the physical infrastructure, determine spatial coordinates of the information element (4) in the coordinate system of the at least one second spatial environment (3), and augment the physical infrastructure with the at least one information element (4) at said determined spatial coordinates.

As another example, some embodiments include a mobile device including one or more of the augmented reality engines described herein.

In some embodiments, the mobile device comprises: a smartphone, a tablet, a head-mounted display device, an augmented reality headset, and/or a virtual reality headset.

DETAILED DESCRIPTION

In some embodiments, a method includes:
Acquiring 3-dimensional data of a first spatial environment within the physical infrastructure, the first spatial environment being dimensioned by a coordinate system of the first spatial environment,
defining at least one second spatial environment as a partial subspace of the first spatial environment, the at least one second spatial environment being dimensioned by a coordinate system of the at least one second spatial environment and the at least one second spatial environment comprising at least one first marker item and at least one second marker item,
creating at least one simultaneous location and mapping map (SLAM) of the at least one second spatial environment (3), the at least one simultaneous location and mapping map being dimensioned by a coordinate system of the at least one simultaneous location and mapping map,
aligning the coordinate system of the at least one simultaneous location and mapping map to the coordinate system of the at least one second spatial environment,
recognizing at least one first marker identifier and at least one second marker identifier, the at least one first marker identifier corresponding to the at least one first marker item and the at least one second marker identifier corresponding to the at least one second marker item,
determining an absolute position and orientation of the at least one second spatial environment relative to the first spatial environment by aligning the coordinate system of the first spatial environment and the coordinate system of the at least one second spatial environment using the at least one first marker item and the at least one second marker item,
defining the least one information element being related to at least one component of the physical infrastructure,
determining spatial coordinates of the information element in the coordinate system of the at least one second spatial environment, and
augmenting the physical infrastructure with the at least one information element at said determined spatial coordinates.

In some embodiments, there is a method for defining and aligning a partial subspace of a physical infrastructure using markers, wherein the partial subspace can be augmented by an information element at determined spatial coordinates. The first spatial environment represents at least a part of the physical infrastructure. With the first spatial environment a coordinate system (the coordinate system of the first spatial environment) is introduced in the physical infrastructure. The coordinate system of the first spatial environment has the advantage that it can be used to align the at least one second spatial environment in the physical infrastructure.

In some embodiments, the at least one second spatial environment comprises more than one second spatial environment. Multiple second spatial environments may overlap. The at least one simultaneous location and mapping map (SLAM map) is either created newly or at least one simultaneous location and mapping map (SLAM map) is loaded.

For creating the at least one simultaneous location and mapping map (SLAM map), the at least one simultaneous location and mapping map (SLAM map) may be created newly with an arbitrary coordinate system (coordinate system of the at least one simultaneous location and mapping map). The at least one simultaneous location and mapping map (SLAM map) contains at least two SLAM marker items with each at least one SLAM marker identifier within the coordinate system of the at least one simultaneous location and mapping map.

The said marker identifiers are recognized. Then, then the coordinate system of the at least one simultaneous location and mapping map is aligned to the coordinate system of the at least one second spatial environment.

For loading an at least one simultaneous location and mapping map (SLAM map) a coordinate system of the at least one simultaneous location and mapping map is aligned to the coordinate system of the at least one second spatial environment by using recognizing SLAM marker items with SLAM marker identifiers and an augmented reality algorithm.

In some embodiments, the physical infrastructure is a technical infrastructure, an infrastructure within a building, an infrastructure outdoors, an infrastructure of production plants and/or a factory infrastructure. The physical infrastructure may also be "physical" in a virtual reality application and represent a physical infrastructure although being virtual. According to a further embodiment the physical infrastructure is three-dimensional.

In some embodiments, the at least one component of the physical infrastructure is a technical component.

A server can manage the partial subspace and its associated metadata, and can provide image processing capabilities like image recognition, OCR, or 3D object detection.

The information element can assist a user to perform actions at exact positions and increases the accuracy of those actions.

The partial subspace or the at least one second spatial environment can also be referred to as an augmented reality bubble, which is hereinafter understood as a spatial area with defined limitations and forming an interior dimension system. Although a bubble may be embodied by any arbitrary geometrical shape, a spherical dimension may be chosen for the sake of simplicity. However, the term "bubbles" is not limited to spherical shapes. In some embodiments, straight geometrical shapes may include straight edges in order to support modular stacking of bubbles within a mathematically super-ordinate coordinate system. In some embodiments, a spherical dimension of a bubble may be chosen to a diameter of 10 meters, surrounding a particular physical location, e.g. a specific GPS position outdoors, or a specific meeting room indoors, or a specific machine.

Examples could be a substation building for electrifying railways (or any other), poles that are installed along a railway track (or their future location), a gas turbine within a gas power plant, a pump station for oil and gas transport and many more. Specifically, bubbles can also refer to a section of a larger piece of physical infrastructure, for example, a segment of a chemical plant.

In some embodiments, each bubble has a coordinate system. Typically, this has its origin within the bubble, and one of the axes points upwards. Typically, the units of the bubble coordinate system are fixed, e.g. meters.

The at least one first marker item and the at least one second marker item, which may also be referred to as identifier or as anchors, which are hereinafter understood as fixed points used to register and align the bubble also referred to as the at least one second spatial environment or the partial subspace in the physical space, e.g. the physical infrastructure.

In some embodiments, each bubble contains a set of at least two anchors, which helps to locate the bubble accurately within the physical world. Each anchor has a fixed position in the bubble coordinate system, e.g. the coordinate system of the at least one second spatial environment.

The anchors (the at least one first marker item and the at least one second marker identifier) are used for determining an absolute position and orientation of the at least one second spatial environment relative to the first spatial environment by aligning the coordinate system of the first spatial environment and the coordinate system of the at least one second spatial environment.

In some embodiments, each anchor has at least one anchor identifier (the at least one first marker identifier corresponding to the at least one first marker item and the at least one second marker identifier corresponding to the at least one second marker item) that describes it in such a way that it can be easily identified as a potential identifier by a user and easily recognized and interpreted by a mobile augmented reality device.

An anchor identifier has the property that it is relatively unique, meaning it exists only once within the bubble (or at least only once in a prominent place, or only a small number of times). Such an anchor identifier can be, for example, the text of an identifier label in a physical plant. These often are already present in chemical, pharmaceutical, or power plants.

Further, an anchor identifier can be, for example the text of a street sign, poster or other large sign, the content of a bar code or QR code of a label, the category of an object as returned by an image-processing algorithm (for example, "cactus" can be an identifier, if there is only one cactus in the bubble) and/or the category of an object as returned by a 3D object detection algorithm (for example, "Pump type XYZ" can be an identifier, if there is an algorithm that can detect and classify all types of pumps in a process plant).

The information element may also be referred to as hologram, which are hereinafter understood as a container for placing technical information precisely at exact positions relative to the real equipment, e.g. a component in the physical infrastructure and augmenting it. A user can place, edit, modify, delete and/or retrieve/see a hologram.

Holograms can be annotations, created by users, for users. These annotations can include speech (audio and speech-to-text); floating 3D models such as arrows; drawings; captured photos and videos from the device, or other documents. Holograms can be, for example, text, 3D models, small animations, instruction documents, photos, videos, etc. Holograms can also contain links to live data, e.g. a chart from a temperature sensor that is inside a machine. Or historical data.

In some embodiments, each hologram has a 3D position in the bubble coordinate system, e.g. the coordinate system of the at least one second spatial environment.

"Simultaneous localization and mapping" (SLAM) is the computational problem of constructing or of updating a map of an unknown environment while simultaneously keeping track of an agent's location within it.

In some embodiments, the least one information element, e.g. the hologram is configured to be modified, added, and/or deleted by a user and/or a machine. The advantage of this embodiment is that content of the information element used for augmenting the bubble environment/second spatial environment can be adapted to a user's needs and preferences and to changing environmental settings in the physical infrastructure or the at least one second spatial environment.

In some embodiments, augmenting the physical infrastructure comprises augmenting by an annotation, a text, a 3D model, a chart, an animation, a moving 3D-model, an instructional document, a photo, a video, an arrow, a drawing, live data, and/or a link to live data. These embodiments may provide a user an intuitive representation of an information element.

In some embodiments, a method including the step of providing an audio output and/or a voice output augmenting the at least one information element is provided. Providing an audio output and/or a voice output may assist a user to perform actions at exact positions and increases the accuracy of those actions.

In some embodiments, the at least one first marker identifier and/or the at least one second identifier include a text, a numeric code, a text of an identifier label, a text of a street sign, a poster, a sign, a bar code, a QR code, a category of an object as returned by an image-processing algorithm, and/or a category of an object as returned by a 3D object detection algorithm. These embodiments may offer different options to choose the at least one first marker identifier and/or the at least one second identifier.

In some embodiments, the at least one second spatial environment being locatable by GPS, Wi-Fi and/or a location mechanism. A user device can determine e.g. its GPS position and gives the user feedback when e.g. the GPS location is accurate enough to e.g. create a bubble.

In some embodiments, the at least one second spatial environment comprising at least one spatial environment identifier being unique within the first spatial environment. The spatial environment identifier can also be referred to as bubble identifier. Bubble identifiers may allow identifying at least one second spatial environment/a bubble more easily, among a set of other second spatial environments/bubbles.

In some embodiments, the at least one spatial environment identifier/bubble identifier includes a room name tag, an object, a serial number, an RF beacon, an NFC tag, and/or a Wi-Fi access point fingerprint. At least one second spatial environment/a bubble may be identified more easily among a set of other second spatial environments/bubbles.

In some embodiments, the at the least one spatial environment identifier/bubble identifier being equal to the at least one first marker identifier and/or the at least one second identifier/anchor identifiers. A spatial environment identifier/bubble identifier can be the same type of information as used for the anchor identifiers/first marker identifier and second marker identifier, e.g. bar codes, image classification results, etc.—but the chosen set of bubble identifiers/spatial environment identifier may be distinct from the set of anchor identifiers. This is because the set of bubble identifiers/spatial environment identifier should be relatively unique regarding the entire set of bubbles within a larger area, e.g. a factory, or a 200 m×200 m outdoor area. For example, in an office building, "kitchen" could be such a bubble identifier. Also, a bubble identifier/spatial environment identifier does not need to be relatively unique within the bubble, as an anchor identifier/first marker identifier and second marker identifier does. So that "printer" could be a good bubble identifier/spatial environment identifier within the printer room of an office building that contains many printers but not a good anchor identifier/first marker identifier and second marker identifier.

In some embodiments, the at least one simultaneous location and mapping map (SLAM) is adapted on changing settings within the at least one second spatial environment. This means that if features of the physical environment change (e.g. light, objects, . . . ) the SLAM is also adapted to these changes. Local optical features of the physical infrastructure and the at least one second spatial environment are known.

In some embodiments, an augmented reality engine for augmenting a physical infrastructure with at least one information element comprises at least one processor and at least one data storage device. The data storage device stores thereon computer executable program code, which, when executed by the processor, causes the augmented reality engine to:
Establish a first spatial environment within the physical infrastructure, the first spatial environment being dimensioned by a coordinate system of the first spatial environment,
define at least one second spatial environment as a partial subspace of the first spatial environment, the at least one second spatial environment being dimensioned by a coordinate system of the at least one second spatial environment and the at least one second spatial environment comprising at least one first marker item and at least one second marker item,
create at least one simultaneous location and mapping map, the at least one simultaneous location and mapping map being dimensioned by a coordinate system of the at least one simultaneous location and mapping map,
align the coordinate system of the at least one simultaneous location and mapping map to the coordinate system of the at least one second spatial environment,
recognize at least one first marker identifier and at least one second marker identifier, the at least one first marker identifier corresponding to the at least one first marker item and the at least one second marker identifier corresponding to the at least one second marker item,
determine an absolute position and orientation of the at least one second spatial environment relative to the first spatial environment by aligning the coordinate system of the first spatial environment and the coordinate system of the at least one second spatial environment using the at least one first marker item and the at least one second marker item,
define the least one information element being related to at least one component of the physical infrastructure,
determine spatial coordinates of the information element in the coordinate system of the at least one second spatial environment,
augment the physical infrastructure with the at least one information element at said determined spatial coordinates.

In some embodiments, a mobile device including the said augmented reality engine supports a local SLAM algorithm and image capturing, a GPS module, a wireless network module, and rendering and displaying capabilities. These means are leveraged by an AR application/method that enables the creation of bubbles/second spatial environments and the placement of annotations/information elements as well as the retrieval and alignment of bubbles/second spatial environments and the display of annotations/information elements.

In some embodiments, the mobile device (client device or user device) is a smartphone, a tablet, a head-mounted display device, an augmented reality headset, and/or a virtual reality headset.

In some embodiments, the mobile device has wide-area network connectivity (either by itself, e.g. a smartphone, or via another device, e.g. a Hololens that communicates with a smartphone as a mobile hotspot).

In some embodiments, the mobile device contains a camera, screen, and appropriate sensory hardware to enable augmented reality interaction.

In some embodiments, the mobile device contains software that can perform local SLAM (simultaneous location and mapping) for augmented reality. Specifically, the SLAM software can create a 3D SLAM map of local optical features of the world around it and save this map to a server. Furthermore, it can retrieve a map of pre-stored features from a server and then use that for tracking. This means the augmented reality device "knows" its own position and orientation within an (arbitrary) coordinate system of the SLAM map. The size of this map is limited to certain 3D area, e.g. approximately 10×10×10 meters.

In some embodiments, the mobile device is also capable of using photos of the environment to perform image recognition tasks on them or sending them to a server for image recognition tasks. It uses this to detect and classify identifiers (e.g. anchor identifiers/first marker identifier and second marker identifier and bubble identifiers/spatial environment identifiers). This detection and classification of identifiers can also make use of 3D information as also used by the SLAM software, e.g. for 3D object classification.

In some embodiments, the SLAM software on the mobile device can estimate the distance of identifiers (e.g. anchor identifiers/first marker identifier and second marker identifier and bubble identifiers/spatial environment identifiers) from the camera, thereby calculating the position of each identifier within the coordinate system of the SLAM software, the coordinate system of the first spatial environment, and coordinate system of the at least one second spatial environment.

In some embodiments, the mobile device also contains a GPS, Wi-Fi-based or similar geolocation device. This lets it determine its position to within a certain accuracy, e.g. approximately 5 meters outdoors, or 50 meters indoors. (If the mobile device itself does not contain GPS sensors, then it may be tethered to another device that does, e.g. a Hololens that communicates with a smartphone as a mobile hotspot, and that smartphone has GPS.) In some embodiments, the mobile device can display annotations/information elements in Augmented Reality in the at least one second spatial environment, which it has retrieved from a server, and let the user view (or hear) them. These annotations/information elements can include speech (audio and speech-to-text); floating 3D models such as arrows; drawings; captured photos and videos from the device, or other documents.

In some embodiments, for information elements, which are live annotations, which show data e.g. from SCADA systems, the mobile device can connect either via a local network to a local controller or edge device, or via a cloud to a live IoT data aggregation platform. The same holds for visualizing historic data, e.g. trends.

In some embodiments, a server that manages the AR Bubbles/second spatial environments and their associated metadata, e.g. SLAM maps, and can provide image processing capabilities like image recognition, OCR, or 3D object detection may also provide a web interface to place additional holograms/information elements into bubbles/second spatial environments. The server can be a cloud server or a local or edge server. The server stores data for its clients in the form of "Augmented Reality Bubbles"/bubbles/second spatial environments.

In some embodiments, each bubble/second spatial environments represents the data for at least one second spatial environments of about 10 m in diameter. Further, each bubble/second spatial environment has a geographic location defined by its GPS coordinates (or by its coordinates in another large-scale coordinate system, e.g. a factory coordinate system or building coordinate system/by the coordinate system of the at least one second spatial environment.

In some embodiments, each bubble/second spatial environment has a coordinate system/coordinate system of the at least one second spatial environment with an (arbitrarily defined) origin, preferably within the bubble/second spatial environment itself. The axes of the bubble coordinate system/coordinate system of the at least one second spatial environment may be arbitrary but are usefully defined so that one of the axes points up, which can be easily detected by an accelerometer.

In some embodiments, each bubble/second spatial environment has a name that has been entered by the user who created it, e.g. "Machine Room 33", as well as some representative photos that will let other users recognize the bubble/second spatial environment easily.

In some embodiments, each bubble/second spatial environment has a list of anchors/first marker item and second marker item, specifically with the type and data for each anchor identifier/first marker identifier and second marker identifier (e.g. "text ABCD", "bar code 12345", "image class cactus"), and also the 3D position of each identifier within the coordinate system of the bubble/coordinate system of the at least one second spatial environment. For each anchor/first marker item and second marker item, the server may also store one or more photos of the object representing the anchor/first marker item and second marker item.

In some embodiments, each bubble/second spatial environment has one or more stored spatial SLAM maps generated by client devices/mobile devices to allow precise tracking. Each SLAM map consists of a set of binary data which is generated and later re-interpreted by the SLAM algorithm on the mobile device. Also, with each SLAM map for the bubble/second spatial environment, the server stores a relative position and orientation of the orientation of the origin of this SLAM map relative to the actual coordinate system of the bubble/coordinate system of the at least one second spatial environment (in case the SLAM map origin is not equal to the bubble origin).

Also, within each SLAM map for the bubble/second spatial environment, the server stores metadata to help determine which of a set of given SLAM maps is likely to be the best for a given the augmented reality device at a given time. This metadata can include, for example, the time and date the SLAM map was created; the type of device or version of SLAM software it was created with; or the type of lighting that was active in the bubble at the time, such as sunlight or artificial lighting or even weather data in case of outside applications.

In some embodiments, each bubble/second spatial environment optionally, contains reference to bubble identifiers/spatial environment identifiers, information that lets clients/users identify it more easily, among a set of other bubbles/spatial environments. This can be the same type of information as used for the anchor identifiers/first marker identifier and second marker identifier—bar codes, image classification results, etc.—but the chosen set of bubble identifiers may be distinct from the set of anchor identifiers/first marker identifier and second marker identifier. This is because the set of bubble identifiers should be relatively unique regarding the entire set of bubbles within a larger area, e.g. a factory, or a 200 m×200 m outdoor area. For example, in an office building, "kitchen" could be such a bubble identifier/spatial environment identifier. Also, a bubble identifier/spatial environment identifier does not need to be relatively unique within the bubble/spatial environment, as an anchor identifier/first marker identifier and second marker identifier does, so that "printer" could be a good bubble identifier/spatial environment identifiers within the printer room of an office building that contains many printers but not a good anchor identifier/first marker identifier and second marker identifier.

In some embodiments, each bubble/second spatial environment contains references to all the data of the holograms within the bubble/second spatial environment—text, audio, photos, videos, documents etc. The server also provides necessary image recognition and/or 3D object detection functionality to process the data that the clients upload, if the clients/users do not perform these tasks entirely on their own.

The server has a search engine that lets clients query it for determining which AR bubble/second spatial environment they are in. The server typically also has user management and security features to allow access control. Different users may only be allowed to view and/or edit only certain bubbles/second spatial environment, or certain holograms/information elements within certain bubbles/second spatial environments, or certain types or groups of holograms/information elements.

In some embodiments, there are non-AR client devices, e.g. PCs, that let users perform administrative tasks, such as rights management, or bulk data import. Specifically, this may include a data import tool to import data from existing 3D models such as BIM systems.

In some embodiments, there is a piece of software and printing device allowing users to generate and print relatively unique labels to attach to the area of a bubble/second spatial environment if there are not enough existing labels or other identifiers (e.g. anchor identifiers/first marker identifier and second marker identifier and bubble identifiers/spatial environment identifiers) within a bubble/second spatial environment.

In some embodiments, a computer program product comprises instructions which, when the program is executed by a computational device, cause the computational device to carry out one or more of the methods described herein.

In some embodiments, a computer-readable storage medium stores instructions which, when executed by a computational device, cause the computational device to carry out one or more of the methods described herein.

Other systems have attempted to solve the problem of persistently registering augmented reality/AR information by saving simple SLAM maps, or by scanning an area with laser scanners and cameras and then performing server-side image processing to align an augmented reality device's camera image with the point cloud. All existing approaches either require complex server-side image processing software, special scanning equipment, or are inaccurate, slow or fragile to lighting changes.

In some embodiments, there is a unique combination of:
  spatial subdivision of the world/physical infrastructure into bubbles/partial subspaces, with a size of a bubble/partial subspace that fits the SLAM capabilities of current AR devices,
  identifier-based anchors/first marker identifier and second marker identifier, which are easy for a human and an AR device to recognize, frequently are already available as signs or labels in the real world, and often correspond to existing identifiers within 3D models,
  use of today's devices' SLAM capabilities for rapid mapping of small areas with AR devices themselves, without having to use expensive infrastructure such as laser scanners, and
  an incremental mapping process that makes frequently accessed areas fast to see AR data in, and does not incur an overhead for areas that have not been accessed yet; and simultaneously makes it easy to adapt to lighting and environmental changes that occur over time.

These may provide several advantages that make it cost-efficient and robust, especially in industrial environments. A first advantage is the interoperability: A system using an enclosed method can take advantage of SLAM algorithms for different device types and from different vendors.

A further advantage is a low server load. As the embodiments takes full advantage of current device capabilities (SLAM, image processing), the server does not have to perform compute-intensive tasks; it simply provides shared persistence, and image processing for those devices that need it.

A further advantage is that embodiments can work in offline mode (without a server)—download the bubble, anchor, SLAM map and hologram information for a site to a mobile AR device before visiting the site and perform the (simple) image recognition tasks on the AR device. Later, upload changes to holograms, anchors and SLAM maps that were made in the field.

A further advantage is that embodiments can work with or without GPS. If no GPS is available, the invention can use a set of globally unique identifiers to recognize a bubble, or use contextual data from another source (e.g. the name of the factory a user is working in.)

A further advantage is that the server does not have to understand the data that it is storing persistently; thus, it is possible to encrypt SLAM maps, bubble metadata and hologram data, e.g. with a shared symmetric key that only client devices on a particular factory site have access to.

A further advantage is that no special scanning or mapping devices required. The embodiments can be operated entirely on current smartphones and current servers; no laser scanners, camera trolleys, drones or similar equipment is required.

A further advantage is cost-efficient incremental shared mapping. It is possible to generate many bubbles from an existing 3D plant model automatically; and after the initial visit by one user, each bubble will have a SLAM map that other users can share.

A further advantage are very low costs of initial deployment. Since no special hardware is required, and areas can be mapped incrementally, the initial cost of deploying the invention in a certain area is very low.

A further advantage are low costs for updates. Updates to the bubble and anchor data can be performed by users in the field as they use the system, so the cost of that is low as well.

A further advantage is that embodiments allow a combination of data from existing models and data from the field. Users in the field can add holograms and anchors to bubbles that have been created off-site by an import tool from an existing 3D model. They can also create new bubbles of their own, e.g. within parts of a factory site that currently do not have 3D models. Subsequent users will be able to access data from both sorts of bubbles.

A further advantage is that embodiments allow a rapid display of AR content in most cases. When a user loads data for a bubble, in most cases, a working SLAM map for this bubble will have been created and stored by another user before them, allowing the AR client device to localize itself quickly.

A further advantage is that embodiments allow a robust identification of position. Since the identification of a bubble is based on scanning identifiers that are "relatively unique", the identified bubble is very likely to be correct.

A further advantage is that embodiments support robustness against offset errors in repetitive environments. Some environments look very repetitive, e.g. a hallway full of identical-looking meeting rooms. Simply relying on image recognition or SLAM maps could lead to AR content being displayed in the wrong room. By scanning identifiers for bubbles (and for anchors), this is much less likely to happen.

In some embodiments, it is possible to feed the 3D data generated by the manual creation of bubbles in the field back into a BIM or asset management system, creating a new geospatial model of the objects that correspond to anchors, with their identifiers and images.

In some embodiments, the detection of bubble identifiers and anchor identifiers, as well as the loading of bubbles based on GPS, can all run without user intervention, with minimal prompting. For example, the AR device could prompt the user to "move your phone around slowly and point it at distinctive objects, particularly text labels", and after 20 seconds or so, the process of identifying a bubble and entering it, with or without a SLAM map, would be complete.

In some embodiments, a user may move seamlessly from one bubble to another, by aligning their respective coordinate systems based on the bubble's GPS positions and/or anchors that are shared between adjacent bubbles and/or an overall 3d model including anchors.

In some embodiments, there are bubbles in non-georeferenced coordinate systems or mobile bubbles. For example, instead of a GPS coordinate system, a system could be set up for a factory site, which works entirely within a "factory" coordinate system. Still, this factory would be subdivided into bubbles, and the identification of bubbles would be based on bubble identifiers. Or, a system could be set up to work in a moving or mobile environment, such as a train, ship, or airplane, with bubbles for different parts of the vehicle. Once the system has identified which vehicle the AR device is in (by manual input or scanning an identifier), the system operates entirely within the vehicle coordinate system, which again is subdivided into bubbles.

In some embodiments, to detect bubble identifiers, the system could also use RF beacons, NFC tags or Wi-Fi access point fingerprinting. To detect anchor identifiers, the system could also use NFC tags—since these work at close range, the SLAM position estimate of the camera would be enough to estimate the position of the corresponding anchor.

In some embodiments, a user interacts as follows. For creating a new bubble manually in the field, the user wishes to create and place new augmented reality content in a place where there is none so far. For this, they activate the "create bubble" functionality on the client device.

The client device determines its GPS position and gives the user feedback when the GPS location is accurate enough to create a bubble. (In some embodiments, another location mechanism, e.g. Wi-Fi, can be used instead of GPS).

The user enters a name for the bubble (and optionally other relevant metadata). The client device prompts the user to take photos of visually interesting elements of the environment (room name tags, serial numbers, posters, etc, as above) to create bubble identifiers to assist in disambiguating the bubbles later, and some overview photos of the bubble to present to other users.

The user walks around the area of the bubble, giving the AR client device ample opportunity to create a detailed SLAM map of the area. Also, the user points the camera at anchor identifiers such as text labels, bar codes, or relatively unique objects.

The client either performs image processing itself to detect and identify these bubble identifiers and anchor identifiers or sends images to the server for processing. It also uses the feature point distance estimation functionality of the SLAM algorithm to calculate the 3D positions of the anchors relative to the (arbitrary) origin of the SLAM map. It optionally also records photographs of each anchor to help users to identify these anchors manually later.

When the client device has created a map which is detailed enough, and enough anchors have been recorded (at least 2), the device tells the user, and uploads the SLAM map, the anchor data, and all the other bubble data to the server.

The origin of the bubble coordinate system is, in this case, the origin of the coordinate system of this first SLAM map.

In some embodiments, a user interacts as follows. For creating a bubble from a pre-existing digital model, there is a pre-existing digital model of equipment within the bubble, e.g. from a BIM system, a factory planning system, a 3D process plant model, or even a 2D map. A user selects an appropriate amount data from this 3D model and uses an import tool running on a non-AR client device, e.g. a PC, to upload the data to the server, in the form of a new bubble.

The import tool creates a new bubble on the server, setting an appropriate friendly name and generating a preview image that can be presented to a user in the field later.

The import tool also creates a list of bubble identifiers based on the list of equipment in the existing 3D model. For example, if the BIM system identifies a room as "Meeting Room 3", and the user knows that by convention, all meeting rooms in the building have a room label on the door, they will add the identifier "Text label Room 3" to the list of bubble identifiers.

The import tool creates an (arbitrary) origin for the bubble coordinate system; this will generally be within the bubble, and may follow a convention, such as the centre of a meeting room, or the nearest point on a 10×10 m grid. The import tool sets the GPS position of the bubble to be equivalent to the origin of the bubble coordinate system (assuming this GPS position is known). The GPS position may be approximate, e.g. accurate only to 100 m, depending on the availability of good map data.

The import tool adds a set of anchors with 3D positions and anchor identifiers to the bubble, based on the list of equipment in the existing 3D model. For example, if the BIM system identifies an ethernet port in the room as "Port 3/57", and the user knows that by convention, all ethernet ports the building have a label above the, they will add the identifier "Text label Port 3/57" to the list of anchors, with the 3D position of this ethernet port. The import tool uploads all this this bubble data to the server.

The import tool then (optionally) generates a set of holograms as AR information to be displayed to users in this bubble, and uploads this to the server as well, with positions and orientations as defined in the coordinate system of the bubble. For example, a hologram could include maintenance information for a printer in a printer room and would be positioned above the location of the printer as defined in the BIM model.

In some embodiments, a user interacts with the method according to the embodiments as follows. For identifying a bubble, the user activates a "find bubble" functionality on the client device. The client device determines the user's approximate geolocation and queries the server for bubbles near that geolocation. This can include a radius, e.g. 200 m, since e.g. a GPS position query may be inaccurate indoors.

If there is more than one possible bubble within the accuracy range of the GPS position, the device prompts the user to point the camera at something that will serve as a bubble identifier. This can be, for example, as described above, a printer within a printer room, or a text label or sign with a room number. It could also be an anchor identifier but does not have to be.

The client then either performs image processing itself to detect and identify these identifiers or sends images to the server for processing. With the resulting set of bubble identifiers, the client then performs a query to the server for a refinement of the GPS-based query. If there is still more than one possible resulting bubble, this process continues, with the user pointing the camera at more objects.

The client software may also present a (shorter) list of possible bubbles to the user, along with the friendly names and identifying pictures, so that the user may manually select the bubble they are located in. At the end of this process, the augmented reality device knows exactly which bubble it is in.

In some embodiments, a user interacts as follows. For entering a bubble using a SLAM map, once the client device knows which bubble the user is in, it loads the corresponding set of anchors and at least one appropriate SLAM map from the server. (Appropriate meaning the SLAM map was created by the same SLAM software, on a similar device, not too long ago, and under similar lighting conditions.)

If no SLAM map is available, e.g. because no user has been on site yet with an augmented reality device of this type, see "Entering a bubble without a SLAM map" below. The SLAM algorithm then attempts to relocalize the position of the augmented reality device based on the SLAM map. For this, it prompts the user to move around a little, giving the device a chance to map out the environment and match it to the stored SLAM map.

If the SLAM relocalization algorithm is successful, it will return the position and orientation of the camera relative to the origin of the SLAM map. With this information, and the stored position and orientation of the SLAM map's origin relative to the bubble's origin, the augmented reality device calculates its position and orientation relative to the bubble coordinate system and can now display holograms in the correct position and orientation.

In some embodiments, the AR client device can also refine the SLAM map based on the current lighting conditions and save this as a new additional SLAM map to the server.

In some embodiments, a user interacts as follows. For entering a bubble without a SLAM map. If the SLAM relocalization is not successful (e.g. because the furniture in a room has been moved around, or the lighting has changed), or if there is no stored SLAM map for this device type yet, the SLAM algorithm will be able to identify the position and orientation of the device relative to an arbitrary new coordinate system it has created itself, but it will not be able to match this to a stored SLAM map. In this case, the augmented reality device prompts the user to point the camera at anchor identifiers such as text labels, bar codes, or relatively unique objects.

The client then either performs image processing itself to detect and identify these identifiers or sends images to the server for processing. It also uses the feature point distance estimation functionality from the SLAM algorithm to determine where (within the coordinate system of the new SLAM map) these identifiers are in 3D space.

In some embodiments, the AR client device may also present the user with a list of photographs of anchors and ask the user to point the AR device at where the corresponding objects are and locate them in the 3D space. This is useful when the anchor objects are hard to identify for an algorithm, but easy to identify for a human.

When enough anchors have been identified (at least 2), the client device performs a geometric calculation to compute a rotation and translation which will optimally align the measured 3D positions of the identified anchors with the stored 3D positions of the same anchors from the server. (This transformation may be constrained e.g. to an upright rotation assuming the client device has an accelerometer which can measure the direction of gravity accurately.)

This transformation is now the position and orientation of the new SLAM map's origin relative to the bubble's origin. With this, the augmented reality device calculates its position and orientation relative to the bubble coordinate system and can now display holograms in the correct position and orientation. In some embodiments, the device may then store the newly created SLAM map, with its newly calculated transformation and metadata, on the server, so that this may be used for rapid relocalization in the future.

In some embodiments, a user interacts as follows. For refining a bubble by updating/adding anchors, when a user has entered a bubble, they may choose to update the position, the identifiers, or the photographs of anchors within the bubble. This is particularly useful if the bubble has been created from a pre-existing digital model. For example, one of the anchors in a bubble may be wrong, because it was generated from an as-planned BIM model, but the equipment in the room was built slightly differently. In this case, the AR client device can visualize the positions and identifiers of all the stored anchors within a bubble, and the user can interactively move individual anchors around so that they align with the real objects (or their text labels).

Also, a user may delete an anchor for an object that simply is not there. Also, a user may create a new anchor to add to the bubble. For example, the import tool may have generated anchors for all the ethernet ports in a room, and the user on site might choose to add the anchor of a sign fixed to the wall with a departmental motto, which was not in the BIM model but is easy to identify.

Specifically, the user may wish to attach a new label, with an arbitrarily generated text tag or QR code, to the wall or a piece of equipment. For this, they could use the label printing software to print a set of unique labels before visiting the site, and then randomly pick one label and stick it to the wall. They then use the AR client device to scan this new label and add it to the list of anchors in the bubble.

Adding a new anchor is particularly useful if the existing anchors all correspond to small labels that are hard to read, which makes entering a bubble without a SLAM map more difficult. The user can add new, easy-to-read labels so that entering the bubble without a SLAM map becomes easier in the future.

In some embodiments, a user interacts as follows. For bringing content from an existing 3D site model into the field—e.g. from a model of a process plant, or a BIM model, first, use the process described in "creating a bubble from a pre-existing digital model" to create a number of bubbles (e.g. every room, or every 10 meters) for the plant/building, with appropriate holograms for the data to be displayed.

Second, send a user (or number of users) to the actual plant/building site. Choose all areas of the site that users will be visiting frequently. The user walks around the site, using one type of AR client device, e.g. a mobile phone, and then, for each bubble in this frequently visited area, identifies the bubble, enters the bubble without a SLAM map (as there is none yet), and stores the SLAM map for this type of device and optionally refines the bubble by adding extra anchors.

From then on, any user with this type of AR client device will be able to enter the bubble with a SLAM map quickly and easily.

Users visiting "infrequent areas" will not be able to enter the bubble with a SLAM map at first. Instead, for each bubble in such an infrequent area, a user will have to enter the bubble without a SLAM map once; subsequent users will be able to enter the bubble with a SLAM map.

In some embodiments, a user interacts as follows. For introducing a new type of AR client device to a site, e.g. introduce a Hololens to a process plant once AR content has been generated and placed using a smartphone, a user or several users are sent to the frequently visited areas of the site. For each bubble, using the new AR client device, identify the bubble, enter the bubble without a SLAM map and save the newly created SLAM map for the device. Again, as a result, in the frequently-visited areas, users will be able to use their new kind of AR device with a SLAM map, and in all other areas, the first user of a bubble will have to enter the bubble without a SLAM map first.

In some embodiments, a user interacts with the method according to the embodiments as follows. For Updating bubbles to reflect changes in appearance, lighting or positions of objects with anchors, any user who enters a bubble with or without a SLAM map can save the new SLAM map to the server (this can even be automatic within the AR client device). Any user with appropriate permissions may choose to refine a bubble to update the position of existing anchors (this can even be automatic within the AR client device, e.g. if it detects that one anchor has moved significantly relative to the others in a bubble).

In some embodiments, a user interacts with the method according to the embodiments as follows. For Combining data from an existing model and data entered in the field, first, use the process described in "creating a bubble from a pre-existing digital model" to create a bubble for buildings on a site that have digital models.

Then, manually create bubbles in the field for those areas of a site (e.g. outdoor areas) that do not have a building model there yet. Users will be able to persistently place and view AR content in both types of areas.

Figure 1:
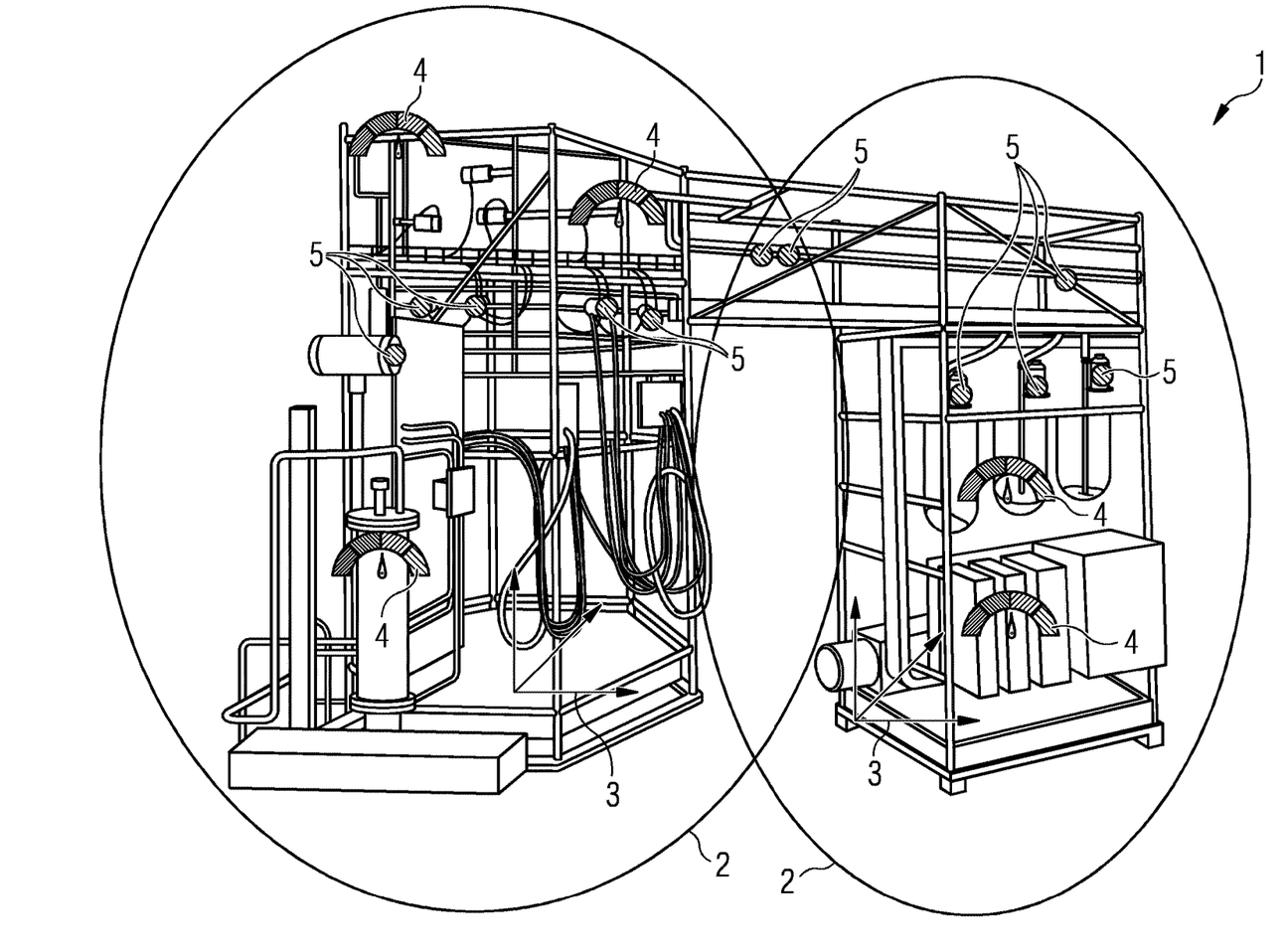
The FIGURE shows partial subspaces of a physical infrastructure aligned by marker items and augmented with information elements.

FIG. 1 show partial subspaces, e.g. second spatial environments 2 of a physical infrastructure, e.g. a first spatial environment 1 aligned by first marker items 5/second marker items 5 and augmented with information elements 4.

The first spatial environment 1 is established within the physical infrastructure 1. The first spatial environment 1 are dimensioned by a coordinate system of the first spatial environment.

The second spatial environments 2 are defined as partial subspaces of the first spatial environment 1. The second spatial environments 2 are dimensioned by coordinate systems of the second spatial environment 3.

At least one simultaneous location and mapping map is loaded. The at least one simultaneous location and mapping map comprises eleven marker items 5 (at least one first marker items 5 and at least one second marker items are necessary for each second spatial environment 2).

At least one first marker identifier and at least one second marker identifier are identified for each second spatial environment 2. The at least one first marker identifier correspond to the at least one first marker item 5 and the at least one second marker identifier correspond to the at least one second marker item 5.

Absolute positions of the second spatial environments 2 relative to the first spatial environment 1 are determined by aligning the coordinate system of the first spatial environment and the coordinate systems of the second spatial environment 3 using the at least one first marker item 5 and the at least one second item 5.

At least one information element 4 being related to at least one component of the physical infrastructure is defined.

Spatial coordinates of the information element 4 are defined in the coordinate system of the second spatial environment 3.

The physical infrastructure is augmented with five information elements 4 at said determined spatial coordinates.

Although the teachings of the present disclosure have been explained in relation to example embodiments as mentioned above, it is to be understood that many other possible modifications and variations can be made without departing from the scope thereof. It is, therefore, contemplated that the appended claim or claims will cover such modifications and variations that fall within the true scope of the disclosure.

LIST OF REFERENCE SIGNS 1 first spatial environment
2 second spatial environment
3 coordinate system of the at least one second spatial environment
4 information element
5 first marker item/second marker item

What is claimed is:

1. A method for augmenting a physical infrastructure with an information element, the method comprising:
   acquiring 3-dimensional data of a first spatial environment within the physical infrastructure, the first spatial environment dimensioned by a coordinate system of the first spatial environment;
   defining a second spatial environment as a partial subspace of the first spatial environment, the second spatial environment dimensioned by a coordinate system of the second spatial environment and comprising a first marker item and a second marker item;
   creating a simultaneous location and mapping map (SLAM) of the second spatial environment, the SLAM map dimensioned by a coordinate system of the SLAM map, wherein the SLAM map contains two SLAM marker items with a respective SLAM marker identifier within the coordinate system of the SLAM map;
   recognizing the SLAM marker identifiers;
   aligning the coordinate system of the SLAM map to the coordinate system of the second spatial environment;
   recognizing a first marker identifier and a second marker identifier, the first marker identifier corresponding to the first marker item and the second marker identifier corresponding to the second marker item;
   determining an absolute position and orientation of the second spatial environment relative to the first spatial environment by matching the first marker item and the second marker item to align the coordinate system of the first spatial environment and the coordinate system of the second spatial environment;
   defining the information element in relation to a component of the physical infrastructure;
   determining spatial coordinates of the information element in the coordinate system of the second spatial environment; and
   augmenting the physical infrastructure with the information element at said determined spatial coordinates.

2. Method according to claim 1, further comprising changing the information element by a user and/or a machine.

3. Method according to claim 1, wherein augmenting the physical infrastructure comprises at least one element selected from the group consisting of: an annotation, a text, a 3D model, a chart, an animation, a moving 3D-model, an instructional document, a photo, a video, an arrow, a drawing, live data, and a link to live data.

4. Method according to claim 1, further comprising providing an audio output and/or a voice output augmenting the information element.

5. Method according to claim 1, wherein at least one of the first marker identifier and the second identifier includes: a text, a numeric code, a text of an identifier label, a text of a street sign, a poster, a sign, a bar code, a QR code, a category of an object as returned by an image processing algorithm, and/or a category of an object as returned by a 3D object detection algorithm.

6. Method according to claim 5, wherein the one spatial environment identifier is equal to at least one of the first marker identifier and the second marker identifier.

7. Method according to claim 1, wherein the second spatial environment is locatable by GPS, Wi-Fi, and/or a location mechanism.

8. Method according to claim 1, wherein the second spatial environment comprises a spatial environment identifier unique within the first spatial environment.

9. Method according to claim 8, wherein the spatial environment identifier includes at least one element selected from the group consisting of: a room name tag, an object, a serial number, an RF beacon, an NFC tag, and a Wi-Fi access point fingerprint.

10. Method according to claim 1, wherein characteristics of the simultaneous location and SLAM map are adapted on the second spatial environment.

11. An augmented reality engine for augmenting a physical infrastructure with an information element, the augmented reality engine comprising:
 a processor; and
 a data storage device having stored thereon computer executable program code, which, when executed by the processor, causes the augmented reality engine to:
 establish a first spatial environment within the physical infrastructure, the first spatial environment dimensioned by a coordinate system of the first spatial environment; define a second spatial environment as a partial subspace of the first spatial environment, the second spatial environment dimensioned by a coordinate system of the second spatial environment and comprising a first marker item and a second marker item;
 create a simultaneous location and mapping (SLAM) map, the SLAM map dimensioned by a coordinate system, wherein the SLAM map contains at least two SLAM marker items with corresponding SLAM marker identifiers within the coordinate system of the SLAM map;
 recognize the said SLAM marker identifiers;
 align the coordinate system of the SLAM map to the coordinate system of the second spatial environment;
 recognize a first marker identifier and a second marker identifier, the first marker identifier corresponding to the first marker item and the second marker identifier corresponding to the second marker item;
 determine an absolute position and orientation of the second spatial environment relative to the first spatial environment by aligning the coordinate system of the first spatial environment and the coordinate system of the second spatial environment using the first marker item and the second marker item;
 define an information element in relation to a component of the physical infrastructure;
 determine spatial coordinates of the information element in the coordinate system of the second spatial environment; and
 augment the physical infrastructure with the information element at said determined spatial coordinates.

* * * * *